United States Patent
Weidenhaupt et al.

(10) Patent No.: US 12,071,568 B2
(45) Date of Patent: Aug. 27, 2024

(54) ADHESIVE MIXTURES FOR UNCURED RUBBERS

(71) Applicant: LANXESS Deutschland GmbH, Cologne (DE)

(72) Inventors: Hermann-Josef Weidenhaupt, Pulheim (DE); Melanie Wiedemeier-Jarad, Dormagen (DE); Stephan Meese, Leverkusen (DE); Jens-Hendrik Fischer, Leverkusen (DE); Nele De Smet, Nieuwerkerken (BE)

(73) Assignee: LANXESS Deutschland GmbH, Cologne (DE)

( * ) Notice: Subject to any disclaimer, the term of this patent is extended or adjusted under 35 U.S.C. 154(b) by 818 days.

(21) Appl. No.: 17/258,365

(22) PCT Filed: Jul. 22, 2019

(86) PCT No.: PCT/EP2019/069631
§ 371 (c)(1),
(2) Date: Jan. 6, 2021

(87) PCT Pub. No.: WO2020/020807
PCT Pub. Date: Jan. 30, 2020

(65) Prior Publication Data
US 2021/0292614 A1    Sep. 23, 2021

(30) Foreign Application Priority Data
Jul. 26, 2018 (EP) .................... 18185847

(51) Int. Cl.
| | | |
|---|---|---|
| *C09J 161/28* | (2006.01) | |
| *C08K 3/36* | (2006.01) | |
| *C08K 5/12* | (2006.01) | |
| *C08K 5/3492* | (2006.01) | |
| *C08K 5/47* | (2006.01) | |
| *C08L 7/00* | (2006.01) | |

(52) U.S. Cl.
CPC .............. *C09J 161/28* (2013.01); *C08K 3/36* (2013.01); *C08K 5/12* (2013.01); *C08K 5/34922* (2013.01); *C08K 5/47* (2013.01); *C08L 7/00* (2013.01)

(58) Field of Classification Search
CPC ........... C09J 161/28; C09J 11/00; C08K 3/36; C08K 5/12; C08K 5/34922; C08K 5/47; C08K 3/04; C08K 5/13; C08K 5/44; C08K 5/107; C08K 3/22; C08K 3/06; C08L 7/00
See application file for complete search history.

(56) References Cited

U.S. PATENT DOCUMENTS

| | | | | |
|---|---|---|---|---|
| 2,891,924 | A * | 6/1959 | Doak ................. | C08K 5/47 524/575.5 |
| 3,579,460 | A * | 5/1971 | Sicheneder et al. ..... | C08K 5/47 525/348 |
| 4,125,512 | A * | 11/1978 | Schubart ................. | C08K 3/22 428/394 |
| 5,792,805 | A * | 8/1998 | Williams ........... | C08K 5/34922 524/102 |
| 2009/0250151 | A1* | 10/2009 | Galimberti ............ | B60C 1/0025 152/451 |

FOREIGN PATENT DOCUMENTS

| | | | |
|---|---|---|---|
| EP | 0677546 | A1 | 10/1995 |
| EP | 0721946 | A1 | 7/1996 |
| EP | 2960278 | A1 | 12/2015 |
| JP | 2008308632 | A * | 12/2008 |
| JP | 2008308632 | A | 12/2008 |

OTHER PUBLICATIONS

European Search Report from corresponding European Patent Application No. 18185847, dated Jan. 29, 2018, three pages.
Abhitha, K. et al. "Non-regulated Accelerator (DCBS/DBBS) Incorporated Natural Rubber Formulations—Cure Characteristics and Mechanical Properties", International Journal of Research and Scientific Innovation. (Jun. 1, 2017). XP055548418, available from the Internet at www.rsisinternational.org/IJRS, 6 pages.

* cited by examiner

*Primary Examiner* — K. Boyle
(74) *Attorney, Agent, or Firm* — Nicanor A. Kohncke; Christopher L. McDavid; Ewa M. Wozniak

(57) ABSTRACT

The present invention relates to adhesive mixtures containing resorcinol and/or resorcinol esters, melamine formaldehyde ethers and sulfenamide derivatives and also silica for use in rubbers, to the production thereof, to vulcanizates and composite articles produced therefrom and to the use thereof.

13 Claims, No Drawings

ADHESIVE MIXTURES FOR UNCURED RUBBERS

CROSS REFERENCE TO RELATED PATENT APPLICATIONS

The present patent application claims the right of priority under 35 U.S.C. § 119 (a)-(d) and 35 U.S.C. § 365 of International Application No. PCT/EP2019/069631, filed 22 Jul. 2019, which was published in German as International Patent Publication No. WO 2020/020807 A1 on 2 Sep. 2004, which is entitled to the right of priority of EP 18185847.3 filed on 26 Jul. 2018.

The present invention relates to adhesive mixtures containing resorcinol and/or resorcinol ester, melamine formaldehyde ether and sulfenamide derivatives and also silica for use in rubbers, to the production thereof, to vulcanizates and composite articles produced therefrom and to the use thereof.

Composite articles such as tires, conveyor belts, belts of all kinds, such as V-belts, reinforced hoses, fire hoses or coated fabrics must be both elastic and withstand tensile or compressive stress. Since elastomers deform under stress a strength member is required for force transmission. Depending on the stress such strength members consist of one or more plies of textile or steel cord, said cord types being combined with one another in some cases.

In order to achieve bonding/adhesion of elastomers to the respective strength member a so-called adhesive system may be applied directly to the strength member or the adhesive system may be introduced into the rubber or both methods may be combined with one another.

Adhesive systems provided for coating of strength members are referred to as resorcinol-formaldehyde latex (RFL) and resorcinol-formaldehyde silica (RFS) systems. Both are disperse systems. The main difference between the two systems is in the polarity of the medium. RFL systems are dispersions in the polar medium water while RFS systems may be considered to be dispersions in the non-polar medium of the rubber mixture. A third component, for example silica-based fillers, assumes the function of a carrier.

Commercially available adhesion promoter systems often use resorcinol/resorcinol resins (so-called RFS adhesive systems) which are employed between the fabric inserts or steel cord with the rubber compounds in tire building. They further obtain formaldehyde donors and silica in a rubber mixture. Heat treatment of the mixture causes the resorcinol and formaldehyde donor to form a resorcinol-formaldehyde resin which increases the bonding between the rubber and the strength member.

EP-A 2960278 discloses using dicyclohexylbenzothiazylsulfenamide (DCBS) in rubber and also in rubber-based adhesive mixtures.

The present invention has for its object to find an effective accelerator which makes it possible to provide both rubber-fabric and rubber-metal adhesion having an improved profile of properties for the rubber processing industry while maintaining the quality of the vulcanizates produced with such preparations. In particular, neither their rubber-technical properties nor their good adhesive properties between the insert or the superstrate and the vulcanizates shall be impaired. Processability shall moreover be simple and the process shall accordingly be economic.

A person skilled in the art is aware that the crosslink points and the crosslink density play an important role in vulcanization.

One advantage of sulfur-crosslinking is the option of producing rubber-metal adhesion by means of this vulcanization process. This requires the metal surface to be coated with a brass coating to allow sulfidation. Mechanical anchoring of the rubber to the metal alloy results from Cu-Sx-C structures at the boundary layer of the two materials and is dependent on the vulcanization rate, the sulfur content and the type of rubber.

It is widely thought that the sulfidation at the metal surface is in competition with the rate of vulcanization and that the slower the vulcanization of the rubber chains, the better the rubber will adhere to the metal and the more polysulfide crosslink points/crosslink nodes are formed, the better the bonding of the rubber and the metal. The retarding effect of DCBS has a positive effect on adhesion. Rubber-metal bonds produced with DCBS as a vulcanization accelerator are markedly more stable and durable compared to CBS-based bonds.

The quality of the molded rubber articles is influenced especially by the sulfur bridge bonds, wherein a distinction is made between mono-, di- and polysulfidic bonds. The proportion of monosulfidic bonding sites should ideally be as low as possible.

It is known that the crosslink structure of the commercially available sulfenamides, such as CBS (N-cyclohexyl-2-benzothiazylsulfenamide) or DCBS (N,N-dicyclohexyl-2-benzothiazylsulfenamide), vary markedly.

It is well known that at identical molar concentration CBS forms about ⅓ monosulfidic (S1), ⅓ disulfidic (S2) and ⅓ polysulfidic (Sx) crosslink points in natural rubber (NR). By contrast, DCBS forms more polysulfidic crosslink points compared to CBS. This is reflected in vulcanizates having a high tensile strength compared to CBS-based vulcanizates.

The acceleration in the rubber adhesive mixtures should moreover be chosen such that the flow time leaves a sufficient margin for the reaction of formaldehyde elimination and for resin formation in order that the bond may be largely realized. That is why DCBS with its retarded onset of vulcanization has time and again proven itself to be very particularly advantageous. A person skilled in the art is aware that the use of DCBS is specifically recommended for rubber-steel cord adhesion in particular.

It has now been found that, surprisingly, an adhesive mixture containing resorcinol and/or resorcinol ester, melamine formaldehyde ether and at least one mono- or dibenzothiazylsulfenamide derivative and also silica exhibits excellent adhesive properties.

The present invention provides adhesive mixtures containing resorcinol and/or resorcinol ester of formula (I)

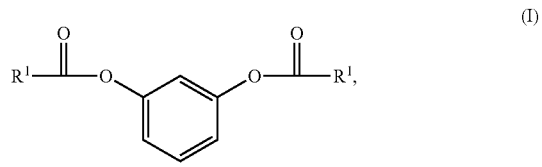

wherein
all radicals $R^1$ are identical or different and represent hydrogen (for resorcinol) or a straight-chain or branched $C_1$-$C_{18}$-alkyl radical or a phenyl radical, preferably methyl or stearyl, and at least one melamine formaldehyde ether of formula (II)

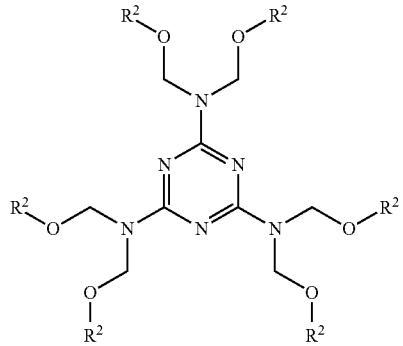

wherein
all radicals $R^2$ are identical or different and represent hydrogen or a straight-chain or branched $C_1$-$C_4$-alkyl radical or a phenyl radical, preferably hydrogen or methyl, particularly preferably methyl, wherein not more than 5, preferably not more than 4, particularly preferably not more than 3, very particularly preferably not more than 2 and most preferably not more than 1 radical $R^2$ represents hydrogen and/or polymeric melamine formaldehyde ethers of formula (III), at least one sulfenamide of formula (III)

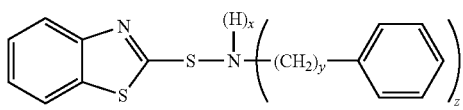

where x=0 or 1 and z=1 or 2, wherein the sum of z and x=2 and y=1-4, at least one silica-based filler, preferably precipitated silica or pyrogenic silica, particularly preferably precipitated silica.

Preferred Resorcinol Esters are Compounds of Formula (I)

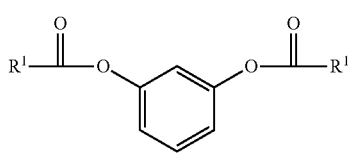

wherein $R^1$ represents methyl and/or stearyl. Resorcinol may be employed as a commercially available compound, obtainable for example from LANXESS Deutschland GmbH.

Preferred Melamine Formaldehyde Ethers of Formula (II)

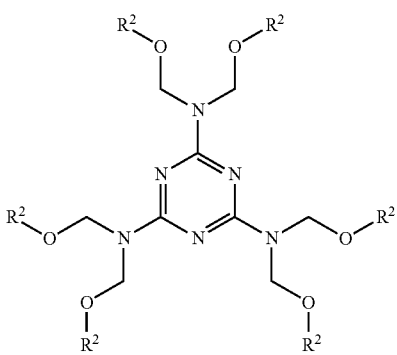

are those in which $R^2$ represents methyl or those in which 2 to 4 of the radicals $R^2$ represent methyl.

In one embodiment of the present invention it is possible to employ, in place of or in addition to the compounds of formula (II), polymers, in particular di-, tri-, or tetramers thereof which are to be understood as meaning compounds in which in each case instead of a radical $CH_2ORq$ (wherein q=3, 4, 5, 6, 7 or 8) one or more of the amino functions of a compound of formula (II) are bonded to a further corresponding compound of formula (II) via —$CH_2$— groups and/or —$CH_2$—O—$CH_2$—. In the description that follows of the various embodiments of the present invention the term "compounds of formula (II)" is to be understood as also including the polymers, in particular di-, tri-, or tetramers, of the compounds. These abovementioned polymers are also commercially available.

Preferred Compounds of Formula (III)

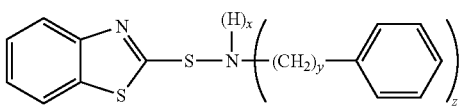

are those in which x=0, y=1 and z=2, i.e. N,N-dibenzyl-2-benzothiazylsulfenamide (DBzBS)).

The compounds of formula (III) employed according to the invention are commercially available compounds. They may alternatively be produced by the process described in EP-A-721946, for example the preferred compound of formula (III) where x=0, y=1 and z=2 by reaction of 2,2'-dibenzothiazolyl disulfide with dibenzylamine in an anhydrous alcohol.

Preferably employed silica-based fillers include:

silica, in particular precipitated silica or fumed silica, preferably produced by precipitation of solutions of silicates or flame hydrolysis of silicon halides having specific surface areas of 5-1000, preferably 20-400, $m^2/g$ (BET surface area) and having primary particle sizes of 10-400 nm. The silicas may optionally also be in the form of mixed oxides with other metal oxides, such as oxides of Al, Mg, Ca, Ba, Zn, Zr, Ti.

synthetic silicates, such as aluminum silicate, alkaline earth metal silicates such as magnesium or calcium silicate, having BET surface areas of 20-400 $m^2/g$ and a primary particle size of 10-400 nm, and/or natural silicates, such as kaolin and other naturally occurring silicas.

In a preferred embodiment of the invention the adhesive mixture according to the invention additionally contains one or more silica-based fillers in a form where resorcinol and/or resorcinol ester and/or the melamine formaldehyde ether have been applied thereto.

The resorcinol and/or resorcinol ester of formula (I) and melamine formaldehyde ether of formula (II) may generally be employed in any desired ratio to one another.

In a preferred embodiment the sum of the resorcinol esters of formula (I) and the melamine formaldehyde ethers of formula (II) is at least 20% by weight.

Particular preference is given to adhesive mixtures in which the total proportion of resorcinol/the resorcinol esters of formula (I), melamine formaldehyde ethers of formula (II) and/or polymers and sulfenamide is 20-80% by weight, in particular 25-55% by weight, based on the total adhesive mixture, wherein the proportion of compounds of formula (III) is 0.1% to 10% by weight, preferably 0.15% to 1.5% by weight. Resorcinol/the resorcinol esters of formula (I) and melamine formaldehyde ethers of formula (II) are ideally applied to silica as a carrier.

In the adhesive mixtures according to the invention the total proportion of resorcinol esters of formula (I), melamine formaldehyde ethers of formula (II) and/or polymers is preferably 20-80% by weight, in particular 25-55% by weight, and the proportion of sulfenamide of formula (III) is 0.1-10% by weight based on the total adhesive mixture with silica.

In a further embodiment of the present invention the adhesive mixture according to the invention additionally contains carbon blacks, in particular carbon blacks produced by the lamp black, furnace black and/or gas black processes.

It will be appreciated that additional fillers may also be used. Especially suitable for this purpose are carbon blacks produced by the lamp black, furnace black or gas black processes and having BET surface areas of 20-200 $m^2/g$, such as SAF, ISAF, IISAF, HAF, FEF or GPF carbon blacks.

These adhesive mixtures according to the invention are preferably produced by mixing together the individual components of the mixture, wherein it is preferable when resorcinol and/or resorcinol esters of formula (I) and melamine formaldehyde ethers are applied to silica.

In a further embodiment of the invention the adhesive mixtures according to the invention additionally comprise rubber, crosslinker, fillers and optionally further additives.

Rubbers employable in the context of the invention include natural rubber (NR) and/or synthetic rubbers. Preferred synthetic rubbers are for example BR—polybutadiene
ABR—butadiene/$C_1$-$C_4$-alkyl acrylate copolymer
CR—polychloroprene
IR—polyisoprene
SBR—styrene/butadiene copolymers having styrene contents of 1-60% by weight, preferably 20-50% by weight
IIR—isobutylene/isoprene copolymers
NBR—butadiene/acrylonitrile copolymers having acrylonitrile contents of 5-60% by weight, preferably 10-50% by weight
HNBR—partially or fully hydrogenated NBR rubber
EPDM—ethylene/propylene/diene copolymers.

These rubbers may be employed in the form of commercially available rubbers.

The present invention further provides processes for producing the adhesive mixtures according to the invention according to which:

- the silica-based filler is treated initially with melamine formaldehyde ether(s) of formula (II) and/or polymers thereof and subsequently with resorcinol ester(s) of formula (I) or
- the silica-based filler is simultaneously treated with melamine formaldehyde ether(s) of formula (II) and/or polymers thereof and resorcinol ester(s) of formula (I) or
- the silica-based filler is treated initially with resorcinol ester(s) of formula (I) and subsequently with melamine formaldehyde ether(s) of formula (II) and/or polymers thereof or
- the silica-based filler is treated with a mixture of melamine formaldehyde ether(s) of formula (II) and/or polymers thereof and resorcinol ester(s) of formula (I) or
- resorcinol esters of formula (I) and melamine formaldehyde ethers of formula (II) and/or polymers thereof are each mixed with the silica-based filler separately and the mixtures are subsequently combined and said filler is subsequently added to the rubber with the sulfenamide of formula (III).

When further additives, such as additional fillers, crosslinkers, vulcanization accelerators and rubber auxiliaries or else aging inhibitors, heat stabilizers, light stabilizers, antioxidants, in particular antiozonants, flame retardants, processing aids, impact strength improvers, plasticizers, tackifiers, blowing agents, dyes, pigments, waxes, extenders, organic acids, retarders, metal oxides and activators, in particular triethanolamine, polyethylene glycol, hexanetriol, silanes and anti-reversion agents, are employed in the mixture, these are stirred into the rubber together with the abovementioned components.

Furthermore, in the mixing process the additives detailed hereinbelow, such as additional fillers, crosslinkers, vulcanization accelerators and rubber auxiliaries etc., may be added separately or in any desired mixture.

The adhesive mixture is preferably produced using an internal mixer with a downstream mixing mill. It is likewise possible to produce the adhesive mixture solely on the mixing mill, at mixing temperatures <110° C., preferably between 20-90° C.

The adhesive mixtures may further contain one or more crosslinkers. Sulfur-based or peroxidic crosslinkers are particularly suitable therefor, particular preference being given to sulfur-based crosslinkers.

Sulfur may be used as the crosslinker in elemental soluble or insoluble form or in the form of sulfur donors. Examples of sulfur donors that can be used are dimorpholyl disulfide (DTDM), 2-morpholinodithiobenzothiazole (MBSS), caprolactam disulfide, dipentamethylenethiuram tetrasulfide (DPTT), and tetramethylthiuram disulfide (TMTD).

In principle, the crosslinking of the elastomer mixture can be effected with sulfur or sulfur donors alone, or together with further vulcanization accelerators, suitable representatives of which are in particular dithiocarbamates, thiurams, thiazoles, xanthogenates, bi- or polycyclic amines, guanidine derivatives, dithiophosphates, caprolactams and thiourea derivatives. Also suitable are zinc diamine diisocyanate, hexamethylenetetramine, 1,3-bis(citraconimidomethyl)benzene and cyclic disulfanes. The rubber mixtures according to the invention preferably comprise sulfur-based crosslinkers and vulcanization accelerators.

Preferably employed peroxidic crosslinkers are bis(2,4-dichlorobenzyl) peroxide, dibenzoyl peroxide, bis(4-chlorobenzoyl) peroxide, 1,1-bis(tert-butylperoxy)-3,3,5-trimethylcyclohexane, tert-butyl perbenzoate, 2,2-bis(tert-butylperoxy)butane, 4,4-di-tert-butyl peroxynonyl valerate, dicumyl peroxide, 2,5-dimethyl-2,5-di(tert-butylperoxy) hexane, tert-butyl cumyl peroxide, 1,3-bis(tert-butylperoxy-isopropyl)benzene, di-tert-butyl peroxide and 2,5-dimethyl-2,5-di(tert-butylperoxy)-3-hexyne.

In addition to these peroxidic crosslinkers it may be advantageous to use further additions which can help to increase the crosslink yield: Suitable examples include triallyl isocyanurate, triallyl cyanurate, trimethylolpropane tri (meth)acrylate, triallyl trimellitate, ethylene glycol di(meth) acrylate, butanediol di(meth)acrylate, trimethylolpropane tri (meth)acrylate, zinc diacrylate, zinc dimethacrylate, 1,2-polybutadiene or N,N'-m-phenylenedimaleimide. Particularly preferably employed crosslinking agents are sulfur, magnesium oxide and/or zinc oxide.

The crosslinking agents and vulcanization accelerators are preferably employed in amounts of 0.1 to 10 phr, particularly preferably of 0.1 to 5 phr.

The adhesive mixtures may contain further additives, such as reaction accelerators, aging inhibitors, heat stabilizers, light stabilizers, antioxidants, in particular antiozonants, flame retardants, processing aids, impact strength improvers, plasticizers, tackifiers, blowing agents, dyes, pigments, waxes, extenders, organic acids, retarders, metal oxides and activators, in particular triethanolamine, polyethylene glycol, hexanetriol, silanes and anti-reversion agents.

These additives are employed in customary amounts which depend in particular on the intended purpose of the vulcanizates. Customary amounts are 0.1 to 30 phr.

Preferably used aging inhibitors include alkylated phenols, styrenated phenol, sterically hindered phenols, preferably 2,6-di-tert-butylphenol, 2,6-di-tert-butyl-p-cresol (BHT), 2,6-di-tert-butyl-4-ethylphenol, sterically hindered phenols containing ester groups, sterically hindered phenols containing thioether, 2,2'-methylenebis(4-methyl-6-tert-butylphenol) (BPH), and also sterically hindered thiobisphenols.

If discoloration of the rubber is not important, it is also possible to employ aminic aging inhibitors, e.g. mixtures of diaryl-p-phenylenediamines (DTPD), octylated diphenylamine (ODPA), phenyl-α-naphthylamine (PAN), phenyl-β-naphthylamine (PBN), preferably those based on phenylenediamine, e.g. N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis(1,4-dimethylpentyl)-p-phenylenediamine (77PD).

Further aging inhibitors include for example phosphites, preferably tris(nonylphenyl) phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI), these mostly being used in combination with the above phenolic aging inhibitors. TMQ, MBI, and MMBI are mainly used for NBR rubbers which are vulcanized using peroxides.

Ozone resistance can be improved via antioxidants such as N-1,3-dimethylbutyl-N'-phenyl-p-phenylenediamine (6PPD), N-1,4-dimethylpentyl-N'-phenyl-p-phenylenediamine (7PPD), N,N'-bis(1,4-dimethylpentyl)-p-phenylenediamine (77PD), enol ethers, or cyclic acetals for example.

Processing aids should ideally become active between the rubber particles and should counter frictional forces during mixing, plasticizing and forming. Processing aids which may be present in the adhesive mixtures according to the invention include all lubricants customary for the processing of plastics, for example hydrocarbons, such as oils, paraffins and PE waxes, fatty alcohols having 6 to 20 carbon atoms, ketones, carboxylic acids, such as fatty acids and montanic acids, oxidized PE wax, metal salts of carboxylic acids, carboxamides and carboxylic esters, for example with the alcohols ethanol, fatty alcohols, glycerol, ethanediol, pentaerythritol and long-chain carboxylic acids as the acid component.

To reduce flammability and to reduce smoke evolution on combustion the adhesive mixture composition according to the invention may also contain flame retardants. Examples of compounds used for this purpose include antimony trioxide, phosphoric esters, chloroparaffin, aluminum hydroxide, boron compounds, zinc compounds, molybdenum trioxide, ferrocene, calcium carbonate and magnesium carbonate.

Further plastics may also be added to the vulcanizate prior to the crosslinking, these acting for example as polymeric processing aids or impact modifiers. These plastics are preferably selected from the group consisting of the homo- and copolymers based on ethylene, propylene, butadiene, styrene, vinyl acetate, vinyl chloride, glycidyl acrylate, glycidyl methacrylate, acrylates and methacrylates having alcohol components of branched or unbranched $C_1$ to $C_{10}$ alcohols, particular preference being given to polyacrylates having identical or different alcohol residues from the group of the $C_4$ to $C_8$ alcohols, especially of butanol, hexanol, octanol and 2-ethylhexanol, polymethylmethacrylate, methyl methacrylate-butyl acrylate copolymers, methyl methacrylate-butyl methacrylate copolymers, ethylene-vinyl acetate copolymers, chlorinated polyethylene, ethylene-propylene copolymers, ethylene-propylene-diene copolymers.

In a preferred embodiment, the elastomer mixture contains 0.1 to 50 phr of the anti-reversion agent 1,6-bis(N,N-dibenzylthiocarbamoyldithio)hexane (CAS No. 151900-44-6). The adhesive mixtures according to the invention result in good adhesion between rubber and polyamide, viscose, polyester, aramid or steel cord; very particularly between rubber and textile fibers.

The present invention further provides for the use of the mixtures according to the invention as adhesion promoters in rubber mixtures, preferably in sulfur-crosslinkable rubber mixtures, particularly preferably in rubber mixtures containing natural and/or synthetic rubbers.

The present invention further provides vulcanizates obtainable by vulcanization of the rubber-containing adhesive mixtures according to the invention preferably at blend temperatures of 100° C. to 200° C., particularly preferably at blend temperatures of 130° C. to 180° C., and the corresponding process for producing vulcanizates by vulcanization of the adhesive mixtures according to the invention preferably at blend temperatures of 100° C. to 200° C., particularly preferably at blend temperatures of 130° C. to 180° C.

The present invention further provides composite articles, preferably in the form of tires, conveyor belts, belts of all kinds, V-belts, reinforced hoses, fire hoses or coated fabrics containing the vulcanizates according to the invention.

The examples that follow serve to elucidate the invention without being limiting.

WORKING EXAMPLES

Examples for production of adhesive systems:
The reference mixture and rubber mixtures 1 and 2 were produced as follows:

TABLE 1

|  | Adhesive mixture 1 (inv.) | Adhesive mixture 2 (inv.) |
|---|---|---|
| Silica CAS No. 7631-86-9 | 12.7 | 12.7 |
| Melamine formaldehyde ether of formula (II) where $R^2$ = hydrogen (4x) and methyl (2x), on silica (50%) | 4.6 | 4.6 |
| Resorcinol and stearic acid (2:1) | 3.4 | 3.4 |
| Benzothiazylsulfenamide of formula (III) where x = 0, y = 1 and z = 2 (DBzBS) | 0.7 | 0.9 |

For production of the rubber mixtures 1 and 2 the silica was initially admixed with melamine formaldehyde ether of formula (II) and subsequently treated with resorcinol and stearic acid, wherein the usage amounts and the reactants are as reported in table 1. These mixtures were subsequently each admixed with the sulfenamide of formula (III).

Production of Rubber Mixture from the Adhesive Mixtures 1 and 2

In an internal mixer natural rubber was consecutively admixed with the adhesive mixture 1/adhesive mixture 2 and subsequently carbon black and mineral oil. The input materials and usage amounts are apparent from table 2. The internal mixer had a temperature <90° C. and the residence time of the adhesive components was less than 5 minutes.

Subsequently, depending on the mixture either dicyclohexylbenzothiazylsulfenamide/sulfur for the reference or the benzothiazylsulfenamide of formula (III) where x=0, y=1 and z=2, sulfur and the other constituents for the rubber mixtures 1 or 2 were incorporated in the amounts reported in table 2 on the mixing mill.

The mixing mill had a temperature of less than 40° C. The resulting milled sheets were used for measurement of tear propagation resistance and rebound elasticity.

The internal mixer had a temperature <90° C. The residence time of the adhesive components was less than 5 minutes.

A further portion of the mixtures was vulcanized in an electric heating press. The crosslinking temperature was T=115° C. and the press pressure was p=100 bar. The crosslinking time was t=3180 seconds at a conversion of t95.

TABLE 2

Rubber formulation

|  | Reference according to EP-A-2960278 | Rubber mixture 1 (inv.) | Rubber mixture 2 (inv.) |
|---|---|---|---|
| TSR natural rubber | 100 | 100 | 100 |
| Carbon black | 50 | 50 | 50 |
| Silica CAS No. 7631-86-9 | 12.7 | 12.7 | 12.7 |
| Mineral oil | 4 | 4 | 4 |
| Zinc oxide | 8 | 8 | 8 |
| Melamine formaldehyde ether of formula (II) where $R^2$ = hydrogen (4x) and methyl (2x), on filler (50%) | 4.6 | 4.6 | 4.6 |
| Resorcinol and stearic acid (2:1) | 3.4 | 3.4 | 3.4 |
| SULFUR | 4.5 | 4.5 | 4.5 |
| Dicyclohexylbenzothiazyl-sulfenamide (pa) | 0.7 |  |  |
| Benzothiazylsulfenamide of formula (III) where x = 0, y = 1 and z = 2 (DBzBS) |  | 0.7 | 0.9 | inv. = inventive
pa = prior art
Quantities reported in phr (parts by weight per 100 parts of rubber)

|  | Trade name | Produced/marketed by |
|---|---|---|
| Natural rubber | TSR/RSS 3 DEFO 700 | Handelshaus Weber & Schaer |
| Carbon black | CORAX N 326 | Degussa-Evonik GmbH |
| Silica | VULKASIL S | LANXESS Deutschland GmbH |
| Polymerized 2,2,4-trimethyl-1,2-dihydroquinoline | VULKANOX HS/LG | LANXESS Deutschland GmbH |
| Zinc oxide | ZINKOXYD AKTIV | LANXESS Deutschland GmbH |
| Sulfur | MAHLSCHWEFEL 90/95 CHANCEL | Solvay Deutschland GmbH |
| Mineral oil | TUDALEN 1849-TE | Hansen&Rosenthal KG |
| Dicyclohexyl-benzothiazyl-sulfenamide | VULKACIT DZ/EGC | LANXESS Deutschland GmbH |
| DBzBS |  | LANXESS Deutschland |
| Melamine formaldehyde ether as condensation product from melamine, formaldehyde, methanol on filler (50%) | COHEDUR A250 | LANXESS Deutschland GmbH |
| Resorcinol and stearic acid (2:1) | COHEDUR RS | LANXESS Deutschland GmbH |

The following methods of measurement were used to determine the properties of rubber mixture/vulcanizates:

Scorch performance (scorch time t3 and t5):

The same test can moreover be used as described above to measure the scorch performance of a mixture. The selected temperature was 130° C. The rotor was run until, after passing through a minimum, the torque value increased to 5 Mooney units above the minimum value (t5). The greater the value (units of seconds), the slower the scorching of the mixture. In practice, a scorch time of more than 300 seconds is usually advantageous, but should be less than 1000 seconds, accounting for processing consistency and time spent.

Tear propagation resistance (according to DIN 53515):

The force with which a vulcanizate damaged by a cut opposes tear propagation is referred to as the tear propagation resistance. It was expressed in N/mm and determined using a tensile test machine according to the "Graves angle test" (DIN 53515) method.

Determination of rebound elasticity was carried out according to DIN 53512.

The measured results for the mixtures are summarized in table 3.

TABLE 3

Summary of results

| Parameter | Unit | DIN | Reference | Rubber formulation 1 | Rubber formulation 2 |
|---|---|---|---|---|---|
| Mooney scorch for 130° C. (t3) | sec | DIN 53523-4 | 753 | 876 | 830 |
| Mooney scorch for 130° C. (t5) | sec | DIN 53523-4 | 841 | 997 | 941 |
| Tear propagation resistance | N/mm | 53515 | 41.7 | 45.2 | 45.9 |
| Rebound resilience at 23° C. | % | 53512 | 40 | 40 | 41 |

Table 4 shows the results of the crosslink node structure analysis at identical molar accelerator concentration in natural rubber (tmax, 150° C.; 1.7 phr sulfur).

TABLE 4

| Parameter | Unit | Reference | Rubber formulation 1 |
|---|---|---|---|
| Monosulfidic crosslink nodes | % | 4 | 12 |
| Disulfidic crosslink nodes | % | 38 | 34 |
| Polysulfidic crosslink nodes | % | 58 | 55 |

Crosslink node structure analysis by the thiol-amine method (Saville and Watson; 1967) is based on selective cleavage of the different sulfur bridges by various reagents. Distinguishing the three types of crosslink nodes from one another requires two thiols of different selectivity. The cleavage of exclusively polysulfidic sulfur bridges was effected using a 0.5 molar solution of i-propanethiol and piperidine in n-heptane. A 1 molar solution of n-hexanethiol and piperidine was used to cleave di- and polysulfidic crosslink nodes at the same time. The monosulfidic bonds did not react with the employed reagents within the decomposition times.

The present invention has been described with reference to specific details of particular embodiments thereof. It is not intended that such details be regarded as limitations upon the scope of the invention except insofar as and to the extent that they are included in the accompanying claims.

As used in this specification and the appended claims, the singular forms "a," "an," and "the" include plural referents unless the content clearly dictates otherwise.

At a conversion of 100% (tmax) the crosslink node structure analysis of the DCBS system for the vulcanizate according to the invention resulted in primarily polysulfidic crosslink points (58%) and a proportion of 38% for the disulfidic crosslink nodes and 4% for the monosulfidic crosslink nodes.

Surprisingly, the DBzBS (N,N-dibenzyl-2-benzothiazylsulfenamide) also forms few monosulfidic crosslink points and a comparably large number of di- and polysulfidic crosslink nodes.

The noticeably longer scorch time of DBBS compared to DCBS (see table 3) slows down the vulcanization and thus the formation of the sulfur bridges between the individual rubber chains and the rubber can therefore readily anchor to the metal alloy via Cu-Sx-C bridges. This guarantees safe use of DBBS as a vulcanization accelerator in tire manufacture.

The results of the measurements show that the adhesive mixture according to the invention exhibits a significant improvement in scorch performance (long scorch time at 130° C.). This has the particular advantage that the flow time of the mixture leaves a sufficient margin for reaction of the formaldehyde elimination/for resin formation in order that the bond may be realized.

Furthermore, physical properties such as rebound elasticity and tear propagation resistance were improved while maintaining comparable further physical parameters, such as 300 modulus and tensile strength.

A What is claimed is:

1. An adhesive mixture containing
resorcinol and/or resorcinol ester of formula (I)

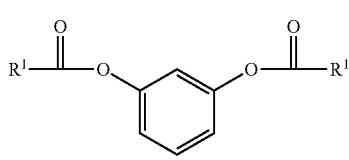
(I)

wherein
all radicals $R^1$ are identical or different and represent hydrogen, a straight-chain or branched $C_1$-$C_{18}$-alkyl radical or a phenyl radical,
and
at least one melamine formaldehyde ether of formula (II)

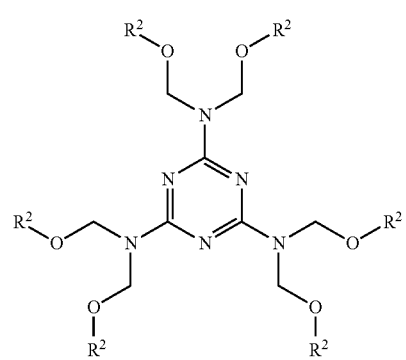
(II)

wherein
all radicals $R^2$ are identical or different and represent hydrogen or a straight-chain or branched $C_1$-$C_4$-alkyl radical or a phenyl radical, wherein not more than 4 $R^2$ radicals represent hydrogen
and/or polymers of melamine formaldehyde ethers of formula (II),
at least one sulfenamide of formula (III)

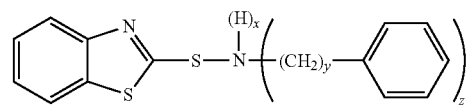

where x=0 or 1 and z=1 or 2, wherein the sum of z and x=2 and
y=1-4, and
at least one silica-based filler,
wherein the total proportion of resorcinol and/or resorcinol esters of formula (I), melamine formaldehyde ethers of formula (II) and/or polymers of melamine formaldehyde ethers of formula (II) is 25-55% by weight and the proportion of sulfenamide of formula (III) is 0.1-10% by weight based on the total adhesive mixture.

2. The adhesive mixture according to claim 1 wherein the sulfenamide of formula (III) is a compound in which x=0, y=1 and z=2.

3. The adhesive mixture according to claim 1 wherein the mixture further comprises natural and/or synthetic rubbers.

4. The adhesive mixture according to claim 1 wherein R1 comprises methyl or stearyl.

5. The adhesive mixture according to claim 1 wherein R2 is hydrogen or methyl.

6. The adhesive mixture according to claim 1 wherein not more than one R2 radical is hydrogen.

7. The adhesive mixture according to claim 1 wherein the at least one silica-based filler is precipitated silica or pyrogenic silica.

8. The adhesive mixture according to claim 1 wherein the adhesive mixture B further comprises natural rubber and/or synthetic rubbers selected from the group consisting of polybutadiene, butadiene/$C_1$-$C_4$-alkyl acrylate copolymer, polychloroprene, polyisoprene, styrene/butadiene copolymers with styrene contents of 1-60% by weight, isobutylene/isoprene copolymers, butadiene/acrylonitrile copolymers with acrylonitrile contents of 5-60% by weight, partially hydrogenated and fully hydrogenated NBR rubber and ethylene/propylene/diene copolymers and mixtures thereof.

9. A process for producing the adhesive mixture according to claim 3, comprising
  treating the at least one silica-based filler initially with melamine formaldehyde ether(s) of formula (II) and/or polymers of melamine formaldehyde ethers of formula (II) and subsequently with resorcinol and/or resorcinol ester(s) of formula (I) or
  treating the at least one silica-based filler simultaneously with melamine formaldehyde ether(s) of formula (II) and/or polymers of melamine formaldehyde ethers of formula (II) and resorcinol ester(s) of formula (I) or
  treating the at least one silica-based filler initially simultaneously with resorcinol ester(s) of formula (I) and subsequently with melamine formaldehyde ether(s) of formula (II) and/or polymers of melamine formaldehyde ethers of formula (II) or
  treating the at least one silica-based filler with a mixture of melamine formaldehyde ether(s) of formula (II) and/or polymers of melamine formaldehyde ethers of formula (II) and resorcinol ester(s) of formula (I) or
  mixing resorcinol esters of formula (I) and melamine formaldehyde ethers of formula (II) and/or polymers of melamine formaldehyde ethers of formula (II) with the at least one silica-based filler separately whereby mixtures are formed and the mixtures are subsequently combined and the at least one silica-based filler is subsequently added to the natural and/or synthetic rubbers with the sulfenamide of formula (III).

10. A vulcanizate obtained by vulcanization of the adhesive mixture as claimed in claim 3 at blend temperatures of 100° C. to 200° C.

11. A process for producing a vulcanizate comprising vulcanizing the adhesive mixture of claim 3 at blend temperatures of 100° C. to 200° C.

12. A composite article containing a vulcanizate as claimed in claim 10.

13. The composite article as claimed in claim 12, wherein said composite article is selected from tires, conveyor belts, belts of all kinds, V-belts, reinforced hoses, fire hoses and coated fabrics.

* * * * *